US012711238B2

(12) United States Patent
Tyler et al.

(10) Patent No.: US 12,711,238 B2
(45) Date of Patent: Aug. 18, 2026

(54) TECHNIQUES FOR APPLICATION ARCHITECTURE MANAGEMENT

(71) Applicant: Ally Financial Inc., Detroit, MI (US)

(72) Inventors: Adam Tyler, Charlotte, NC (US); Nimish Donde, Charlotte, NC (US); Travis Warren, Charlotte, NC (US); James Barney, Charlotte, NC (US)

(73) Assignee: Ally Financial Inc., Detroit, MI (US)

(*) Notice: Subject to any disclaimer, the term of this patent is extended or adjusted under 35 U.S.C. 154(b) by 309 days.

(21) Appl. No.: 18/474,945

(22) Filed: Sep. 26, 2023

(65) Prior Publication Data

US 2025/0103725 A1 Mar. 27, 2025

(51) Int. Cl.
*G06F 21/57* (2013.01)
*G06F 8/36* (2018.01)
*G06F 8/41* (2018.01)
*G06F 11/3604* (2025.01)

(52) U.S. Cl.
CPC ............ *G06F 21/577* (2013.01); *G06F 8/447* (2013.01); *G06F 11/3616* (2013.01); *G06F 8/36* (2013.01); *G06F 2221/033* (2013.01)

(58) Field of Classification Search
CPC ..... G06F 8/20; G06F 8/24; G06F 8/34; G06F 8/35; G06F 8/36; G06F 21/577; G06F 11/3616; G06F 2221/033
See application file for complete search history.

(56) References Cited

U.S. PATENT DOCUMENTS 11,416,369 B1 * 8/2022 Trapani ............... G06F 11/3055
12,072,790 B1 * 8/2024 Pearson .............. G06F 11/3676
2005/0108206 A1 * 5/2005 Lam ...................... G06F 16/256
2009/0037875 A1 * 2/2009 Jones ........................ G06F 8/34 717/109

(Continued)

FOREIGN PATENT DOCUMENTS

JP 2019500676 A * 1/2019 ........... G06F 21/105

OTHER PUBLICATIONS

Abdellatif, Lasbahani, et al., Deals with integrating of security specifications during software design phase using MDA approach, Proc of the Second International Conference on Internet of things, Data and Cloud Computing, 2017, 7 pages, [retrieved on Apr. 20, 2026], Retrieved from the Internet: <URL:http://dl.acm.org/>.*

*Primary Examiner* — Geoffrey R St Leger
(74) *Attorney, Agent, or Firm* — Holland & Hart LLP

(57) ABSTRACT

An organization may maintain a platform that may support the generation and management of application architectures. The platform may provide a selection of architecture components for an application to a user, and the user may select one or more of the architecture components to generate a template or outline of an application. The platform may configure the selected architecture components, for example to integrate the selected architecture components together, and may provide the generated application to the user. The platform may configure the selection of architecture components to support security policies or other application management techniques for an application. For example, the platform may include or associate one or more tags with the architecture components that may allow management software to track one or more metrics of the application.

18 Claims, 5 Drawing Sheets

(56) References Cited

U.S. PATENT DOCUMENTS

| | | | | |
|---|---|---|---|---|
| 2011/0071884 | A1* | 3/2011 | Michaelis | G06Q 30/02<br>707/769 |
| 2014/0223416 | A1* | 8/2014 | Cohen | G06F 11/3452<br>717/123 |
| 2018/0143891 | A1* | 5/2018 | Polisetty | G06F 9/542 |
| 2019/0065155 | A1* | 2/2019 | Varadarajan | G06F 8/34 |
| 2023/0351023 | A1* | 11/2023 | Kurian | G06F 21/552 |

* cited by examiner

TECHNIQUES FOR APPLICATION ARCHITECTURE MANAGEMENT

FIELD OF TECHNOLOGY

The present disclosure relates generally to distributed systems and data processing, and more specifically to techniques for application architecture management.

BACKGROUND

An organization (e.g., a company, a corporation, a financial institution, or the like) may implement a cloud-based environment to support development and deployment of applications. The cloud-based environment may provide dynamic computing resources, such as data storage and computing functionality, to applications based on application performance. In some cases, the organization may include or may employ one or more application teams to develop applications for the organization. Such application teams may have varied application needs, experience levels, familiarity with the cloud-based environment of the organization, and so on, that may cause difficulty in developing and managing applications. For example, different application teams may generate applications having diverse configurations (e.g., different security configurations, different program architectures). Accordingly, generating an application that conforms with a security policy of the organization and managing such an application (e.g., monitoring and reporting metrics associated with the application) may be time-consuming or difficult (or both). Additionally, diverse application architectures may increase the difficulty of troubleshooting such applications, which may impose undue cost on the organization.

SUMMARY

The described techniques relate to improved methods, systems, devices, and apparatuses that support techniques for application architecture management. Generally, the described techniques provide for identifying one or more architecture components included in a component registry associated with an organization. In some cases, each architecture component of the component registry may be configured in accordance with a security policy of the organization. The described techniques may further include identifying respective configurations for each of the one or more architecture components and generating an application configured for execution in a cloud-based environment based on integrating the one or more architecture components in accordance with the respective configurations. A platform associated with the organization may provide the application to a device associated with a user based on generating the application.

A method by an apparatus is described. The method may include identifying one or more architecture components included in a component registry associated with an organization, each architecture component of the component registry configured in accordance with a security policy of the organization, identifying respective configurations for each of the one or more architecture components, generating an application configured for execution in a cloud-based environment based at least in part on integrating the one or more architecture components in accordance with the respective configurations, and providing the application to a device associated with a user based at least in part on generating the application.

An apparatus is described. The apparatus may include one or more memories storing processor executable code, and one or more processors coupled with the one or more memories. The one or more processors may individually or collectively operable to execute the code to cause the apparatus to identify one or more architecture components included in a component registry associated with an organization, each architecture component of the component registry configured in accordance with a security policy of the organization, identify respective configurations for each of the one or more architecture components, generate an application configured for execution in a cloud-based environment based at least in part on integrating the one or more architecture components in accordance with the respective configurations, and provide the application to a device associated with a user based at least in part on generating the application.

Another apparatus is described. The apparatus may include means for identifying one or more architecture components included in a component registry associated with an organization, each architecture component of the component registry configured in accordance with a security policy of the organization, means for identifying respective configurations for each of the one or more architecture components, means for generating an application configured for execution in a cloud-based environment based at least in part on integrating the one or more architecture components in accordance with the respective configurations, and means for providing the application to a device associated with a user based at least in part on generating the application.

A non-transitory computer-readable medium storing code is described. The code may include instructions executable by one or more processors to identify one or more architecture components included in a component registry associated with an organization, each architecture component of the component registry configured in accordance with a security policy of the organization, identify respective configurations for each of the one or more architecture components, generate an application configured for execution in a cloud-based environment based at least in part on integrating the one or more architecture components in accordance with the respective configurations, and provide the application to a device associated with a user based at least in part on generating the application.

In some examples of the method, apparatus, and non-transitory computer-readable medium described herein, identifying the one or more architecture components may include operations, features, means, or instructions for providing an indication of the component registry to the device and receiving an application programming interface (API) call comprising a user input indicating the one or more architecture components from the device based at least in part on providing the indication of the component registry.

In some examples of the method, apparatus, and non-transitory computer-readable medium described herein, identifying the respective configurations may include operations, features, means, or instructions for providing an indication of the respective configurations to the device and receiving an API call comprising a user input indicating the respective configurations from the device based at least in part on proving the indication of the respective configurations.

In some examples of the method, apparatus, and non-transitory computer-readable medium described herein, identifying, based at least in part on receiving a user input from the device, that the application may be a test application and removing the application after a duration based at least in part on identifying that the application may be a test application.

Some examples of the method, apparatus, and non-transitory computer-readable medium described herein may further include operations, features, means, or instructions for identifying one or more second architecture components in accordance with a periodicity and adding the one or more second architecture components to the component registry based at least in part on identifying the one or more second architecture components.

Some examples of the method, apparatus, and non-transitory computer-readable medium described herein may further include operations, features, means, or instructions for identifying one or more metrics of the application based at least in part on respective resources associated with the one or more architecture components, generating one or more scores associated with one or more utilities for the application based at least in part on the one or more metrics, and providing the one or more scores to the device.

Some examples of the method, apparatus, and non-transitory computer-readable medium described herein may further include operations, features, means, or instructions for identifying the one or more metrics may be based at least in part on an application identifier, the application identifier may be associated with a source code and one or more resources generated from the source code and the source code comprises a reference to the component registry.

Some examples of the method, apparatus, and non-transitory computer-readable medium described herein may further include operations, features, means, or instructions for transmitting a notification to the device based at least in part on determining that at least one metric of the one or more metrics satisfies a threshold, the notification associated with the at least one metric.

Some examples of the method, apparatus, and non-transitory computer-readable medium described herein may further include operations, features, means, or instructions for providing a remediation option associated with the at least one metric to the device based at least in part on transmitting the notification.

Some examples of the method, apparatus, and non-transitory computer-readable medium described herein may further include operations, features, means, or instructions for updating a first metric of the one or more metrics in accordance with a first periodicity based at least in part on providing the one or more scores to the device and updating a second metric of the one or more metrics in accordance with a second periodicity different than the first periodicity based at least in part on providing the one or more scores to the device.

DETAILED DESCRIPTION

Figure 1:
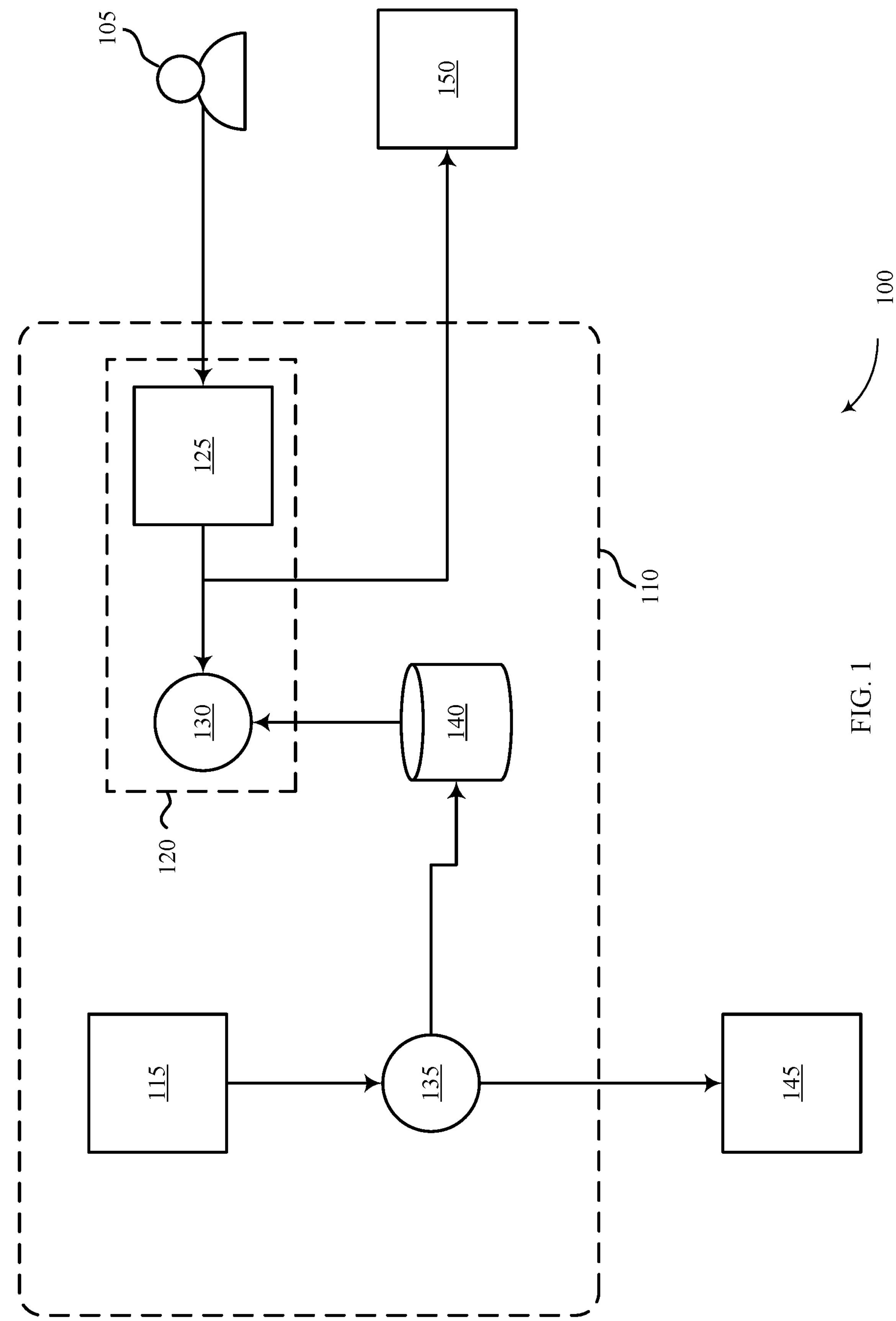
FIG. 1 shows an example of a system that supports techniques for application architecture management in accordance with aspects of the present disclosure.

In some cases, an organization (e.g., a company, a corporation, a financial institution, or the like) may implement a cloud-based environment to support development and deployment of applications. The cloud-based environment may provide dynamic computing resources, such as data storage and computing power, to applications based on application performance. In some cases, the organization may include or may employ one or more application teams to develop applications for the organization. Such application teams may have varied application needs, experience levels, familiarity with the cloud-based environment of the organization, and so on, that may cause difficulty in developing and managing applications. For example, different application teams may generate applications having diverse configurations (e.g., different security configurations, different program architectures). Accordingly, generating an application that conforms with a security policy of the organization and managing such an application (e.g., monitoring and reporting metrics associated with the application) may be time-consuming or difficult (or both). Additionally, diverse application architectures may increase the difficulty of troubleshooting such applications, which may impose undue cost on the organization.

As described herein, an organization may maintain a platform, such as an online portal, a website or application (e.g., a client-server application), a communication session between a device associated with a user and a server, or the like, that may support the generation and management of application architectures. For example, the platform may provide a selection of architecture components for an application to a user, and the user May select one or more of the architecture components to generate a template or outline of an application. The platform may configure the selected architecture components, for example to integrate the selected architecture components together (e.g., may "wire" the architecture components together), and may provide the generated application to the user (e.g., via a device associated with the user). The platform may configure the selection of architecture components to support security policies or other application management techniques for an application. For example, the platform may include or associate one or more tags with the architecture components. which may allow management software to track one or more metrics of the application (e.g., performance metrics). The management software may provide one or more alerts to a user based on the one or more metrics. For example, the management software may collect information from multiple sources to allow processing, aggregation, and actions based on the combined data, which may be associated with an application identifier. Techniques for architecture management as described herein may thus improve security of developing applications (e.g., by ensuring that architecture components align with a security policy of the organization), improve efficiency, and reduce costs associated with application development, provide increased insight into application performance, or a combination thereof.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

FIG. 1 shows an example of a system 100 that supports techniques for application architecture management in accordance with aspects of the present disclosure. The system 100 may include one or more users 105 that may interact (e.g., via one or more devices, applications, or the like) with a platform 110 associated with an organization (e.g., a company, a bank, a corporation, a credit union, a lender, or the like) over a network, such as the Internet. A user 105 described herein may be associated with a device (e.g., a desktop computer, a laptop, a smartphone, a tablet, or other computing system). Similarly, the platform 110 described herein may be associated with one or more devices (e.g., computers, servers, databases, or the like) and one or more programs (e.g., applications, functions, libraries, repositories, computer-executable code, or the like) that may be configured to implement aspects of the platform 110.

The platform 110 may be an example of an online portal, a website or application (e.g., a client-server application), a communication session between a device associated with the user 105 and a server, or the like, which may support the generation and management of application architectures. For example, the platform 110 may provide a selection of architecture components for an application to the user 105, and the user 105 may select one or more of the architecture components to generate a template or outline of an application. The platform 110 may configure the selected architecture components, for example to integrate the selected architecture components together (e.g., may "wire" the architecture components together), and may provide the generated application to the user 105, such as by transmitting or storing the application to an application registry 150. In some examples, the platform 110 may configure the selection of architecture components to include or associate one or more tags with the architecture components that may allow a metric registry 115 to track one or more metrics of the application (e.g., performance metrics).

A user 105 may interact (e.g., via a device) with the platform 110 using an application programming interface (API) interface 120, which may support communications with the device using an API 130. For example, the API interface 120 may receive commands or messages from the device (e.g., via an API call) and may transmit communications to the device (e.g., as a response to the API call). The API interface 120 may include an API gateway 125, that may mediate interactions between the user 105 and the API 130. In some examples, the platform 110 may implement the API 130 within a containerized application (e.g., as part of a containerized architecture).

The platform 110 may include a component registry 140 operable to store one or more supported architecture components. In some examples, the component registry 140 may be an example of a database that may provide reliable and secure data storage for the system 100. In some cases, the platform 110 may include an operator 135, which may monitor and periodically update architecture components within the component registry 140. For example, the operator 135 may be in communication with an external component registry 145, which may store additional application architecture components. In some cases, a team (e.g., a developer team) associated with the organization may maintain the external component registry 145.

For example, the team may build and store one or more modules associated with or corresponding to architecture components within the external component registry 145. Such modules may be built or include or developed in accordance with security policies of the organization, such as access policies, authorization credentials, access tokens, and the like. In some cases, the platform 110 may periodically identify additional architecture components within the external component registry 145 and may add the additional architecture components to the component registry 140.

In some cases, the platform 110 may provide the user 105 with "basic" architecture components, and the user 105 may manually configure the architecture components. For example, the platform 110 may copy one or more selected architecture components from the component registry 140 to the user 105 without integrating the one or more selected architecture components together. Alternatively, the platform 110 may provide one or more project templates, which may include a set of integrated architecture components.

In some cases, the API 130 may include logic (e.g., code, applications, programs) to integrate and configure the architecture components. For example, if the selection of architecture components includes a database, the logic may set name of a table associated with the database (e.g., as an environment variable) and may grant a container associated with application access to the table.

Figure 2:
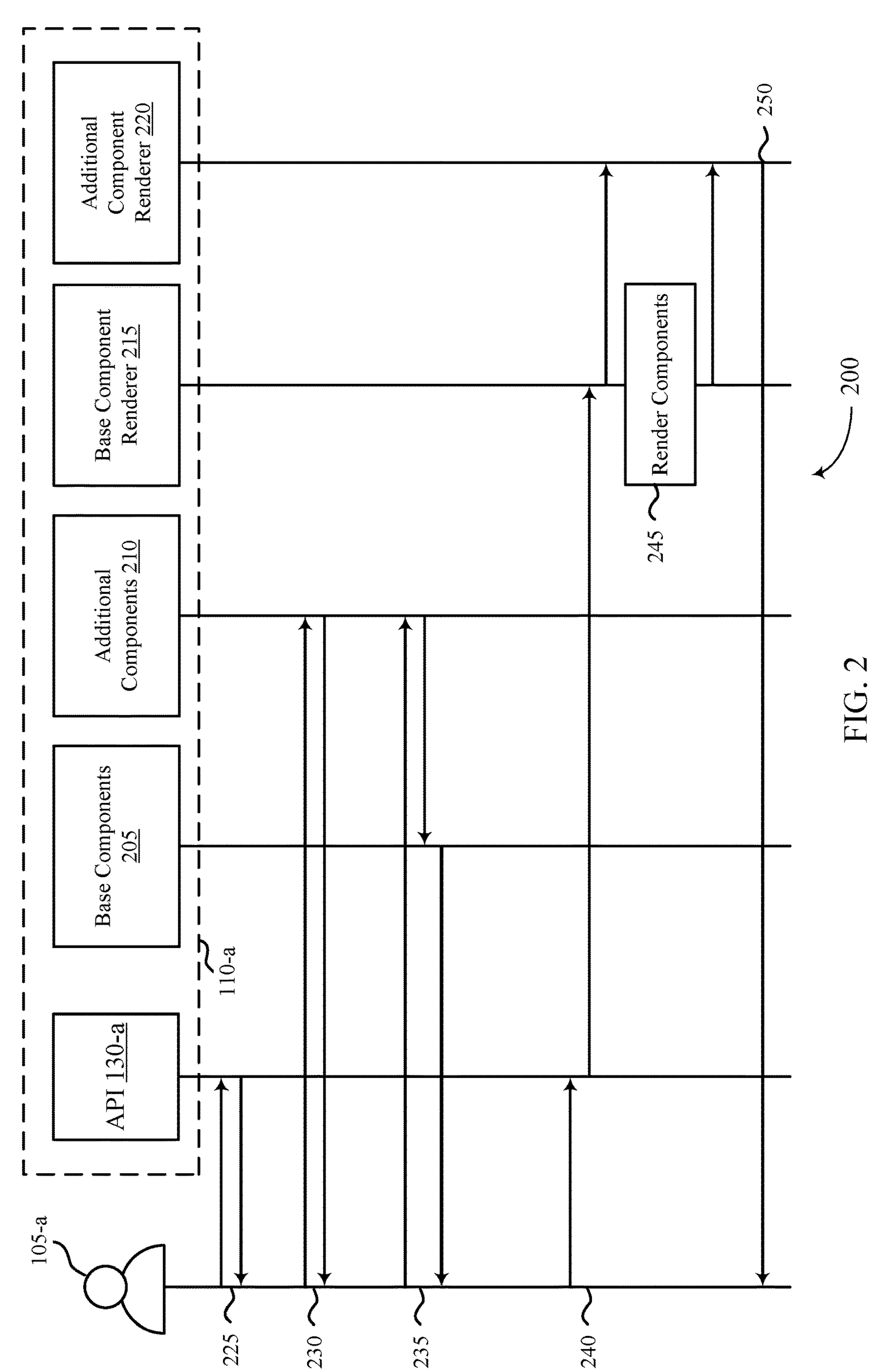
FIG. 2 shows an example of a process flow that supports techniques for application architecture management in accordance with aspects of the present disclosure.

FIG. 2 shows an example of a process flow 200 that supports techniques for application architecture management in accordance with aspects of the present disclosure. The process flow 200 or aspects thereof may be implemented by a platform 110-*a* or aspects of the platform 110-*a*, such as an API 130-*a*. The API 130-*a* may be operable to access architectural components (e.g., via a component registry 140) for developing applications using the platform 110-*a*. For example, the API 130-*a* may access one or more base components 205, one or more additional components 210, or both, and may communicate with the user (e.g., a device associated with the user) using one or more API calls. In the following description of the process flow 200, the operations may be performed in a different order than the order shown. For example, specific operations may also be left out of the process flow 200, or other operations may be added to process flow 200.

Base components 205 may be examples of "basic" architectural components of an application, such as a computational service or a database, among other examples. In some cases, the platform 110-*a* may group one or more base components 205 together to form an application template. Further, the additional components 210 may be architectural components that may be integrated with one or more of the base components 205 to extend the capabilities of or otherwise interface with the one or more base components 205. For example, if the base components 205 include a computational service, the additional components 210 may include a database configured to operate using the computational service. Accordingly, such additional components 210 may be referred to as extensions of the base component 205.

The process flow 200 may illustrate a method to generate an application in accordance with a policy (e.g., a security policy) of an organization. For example, the platform 110-*a* may provide one or more application templates having one or more components arranged in an application architecture, such as a configured set of components (e.g., a template architecture). In some cases, such application architectures may be pre-built or custom built (e.g., by the organization) to comply with security and other policies of the organization.

At 225, the platform 110-*a* may identify one or more architecture components included in a component registry associated with an organization. In some examples, each architecture component of the component registry may be configured in accordance with a security policy of the organization. For example, a user 105-*a* may use a device (e.g., a laptop computer, a desktop computer, a mobile device, or the like) to interface with a portal (e.g., an online portal), such as by transmitting an API call to the API 130-*a* to retrieve an indication of the contents of the component registry.

In response to the API call, the platform 110-*a* may provide an indication of the component registry (e.g., an indication of one or more base components 205) to the device. In some cases, the user may select one or more components from the component registry and may manually configured the one or more components to generate an application. Additionally, or alternatively, the user may select a pre-built architecture that includes the one or more components. After selecting the one or more components, the device may transmit an API call to the platform 110-*a* that includes a user input indicating the one or more selected architecture components.

In some cases, at 230, the user may request (e.g., via an API call) one or more architectural schemes for the selected one or more components. For example, based on the architecture selected by the user at 225, the platform 110-*a* may provide an indication of one or more additional components 210 that may be configured to interface with the one or more components.

At 235, the platform 110-*a* may identify respective configurations for each of the one or more architecture components. For example, the user may request (e.g., via an API call) one or more configuration schemes for the selected one or more components, and the platform 110-*a* may provide, via an API call, an indication of the respective configurations to the device. In some cases, the platform 110-*a* may dynamically generate the configurations based on the one or more components that the user selected. In some examples, the configurations may include metadata for the application, such as one or more tags to classify and track aspects of the application (e.g., performance, resource use, and the like). Additionally, or alternatively, the configurations may include shared logic, such as shared environmental variables for the applications, container names associated with the one or more components, an indication of resources available to the one or more components, access to accounts and networks associated with the organization, or a combination thereof.

At 240, the platform 110-*a* may generate an application configured for execution in a cloud-based environment. For example, the user may transmit the selected one or more components and the selected configuration schemes to the platform 110-*a*. At 245, a base component rendered 245 may render (e.g., configure) the one or more components in accordance with the configurations. Additionally, the additional component renderer 220 may, in some cases, render the one or more additional components 210 selected at 235.

The platform 110-*a* may, at 250, provide the generated application to the user. For example, the platform 110-*a* may provide a file containing the application to the user, may store the application to an application registry (e.g., the application registry 150), or both. Because the application was generated using the one or more components and the configured using the base component renderer 215 and additional component renderer 220, the application may automatically conform to the security and policies of the organization and may thus be ready for immediate deployment into the cloud-based environment.

In some examples, the platform 110-*a* may identify that the application is a test application. For example, as part of, or prior to, providing the one or more components at 225, the platform 110-*a* may provide an option to classify the application as a test application. In such examples, the platform 110—may remove the application after a duration (e.g., after 2 weeks), which may allow generation and efficient management of test applications.

Figure 3:
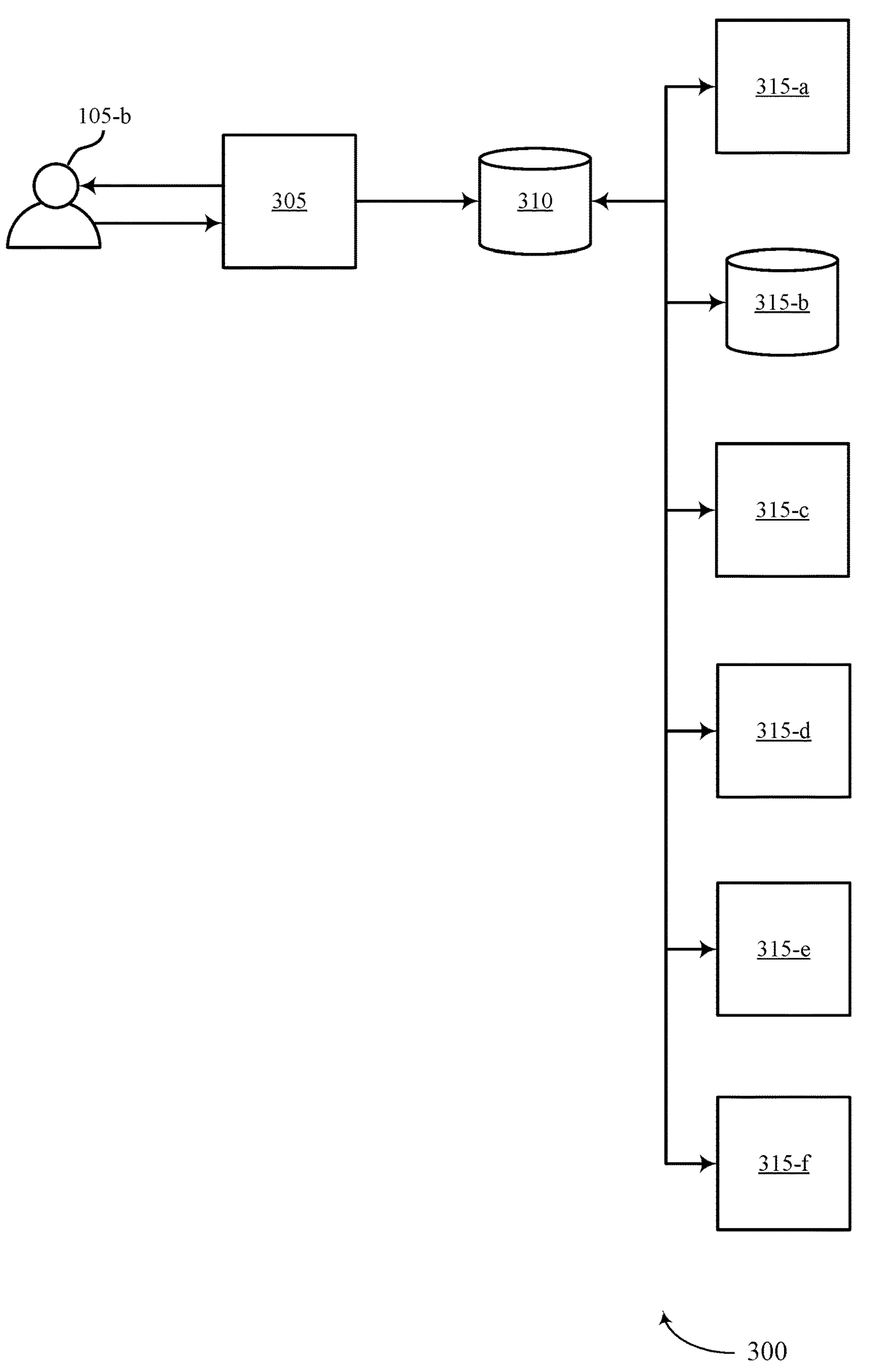
FIG. 3 shows an example of a process flow that supports techniques for application architecture management in accordance with aspects of the present disclosure.

FIG. 3 shows an example of a system 300 that supports techniques for application architecture management in accordance with aspects of the present disclosure. The system 300 may include one or more users 105-*b* that may interact (e.g., via one or more devices, applications, or the like) with a platform associated with an organization (e.g., a company, a bank, a corporation, a credit union, a lender, or the like) over a network, such as the Internet. In some examples, the user 105-*b* may interact with the platform via one or more API calls.

The system 300 may include an application manager 305, which may be configured to manage aspects of applications generated using the platform (e.g., using the platform 110, using the process flow 200). For example, the application manager 305 may identify one or more metrics of an application based on respective resources used by the one or more architecture components of the application. In some examples, the application manager 305 may identify the one or more metrics using an application identifier corresponding to the application. The application identifier may be associated with source code of the application, one or more resources generated from the source code, or both, and may include a reference to a component registry of the platform (e.g., the component registry 140).

The one or more metric and associated resources may originate from multiple sources 315, such as the metric sources 315-*a* through 315-*f*. For example, the metric source 315-*a* may be an example of an application registry (e.g., the application registry 150). The metric source 315-*a* may include one or more source code repositories and one or more branches associated with the application within the application registry. In some examples, the metric source 315-*a* may track one or more combinations of source code repositories, branches, and web-based compute services associated with the application. In such examples, the metric source 315—may include an indication of a cost associated with each combination.

In some cases, the metric source 315-*a* may include one or more metrics associated with continuous integration and continuous deployment (CI/CD) such as a build rate, a deployment rate, a test pass rate, a quantity of errors (e.g., "bugs") associated with the application, a defect escape rate, or a combination thereof. For example, the metric source 315-*a* may include an indication of whether a branch from which the application has deployed no longer exists (e.g., whether the branch is "orphaned"), an indication of whether the branch has been updated within a threshold period of time (e.g., whether the branch is "stale"), or both. Such an indication may support improved troubleshooting, such as by allowing a user to optimize costs by removing certain (e.g., at least some) environments.

The metric source 315-*b* may be an example of a database, such as a configuration management database, that may be configured to store information associated hardware and software aspects of the application, the organization, or both. For example, the metric source 315-*b* may store metadata indication a name of the application, an owner of the application, a manager of the application, or the like.

The metric source 315-*c* may be an example of an asset inventory configured to track assets associated with the application in a cloud-based environment, such as resources and tags associated with a web-based compute service. The application manager 305 may use resource tags associated with the application, along with an API (e.g., an API 130) to access the metric source 315-*c* and calculate a score indicating a degree of conformance of the application to a policy of the organization. For example, the score may indicate whether the application includes correct resource tags for resources associated with the application, may indicate whether the application is correctly using a CI/CD pipeline associated with the organization, an indication of whether the application is using an up-to-date (e.g., most recent) version of the one or more components, or a combination thereof. Such a score may support troubleshooting for the application, such as by identifying non-compliant aspects of the application.

The metric source 315-*d* may be an example of a server-side library that may support efficient communication with a database. In some cases, the metric source 315-*d* may include infrastructure scan results associated with the application. For example, the metric source 315-*d* may associate scan results with affected resources, which may provide teams the ability to identify non-compliant resources, a location (e.g., branch, repository) of such resources, and potential solutions for the non-compliant resources.

The metric source 315-*e* may include a web-based compute service that provides computational resources for the application. The metric source 315-*e* may include an indication of a cost of the application, such as a budget allocated to the application, along with a forecasted (e.g., predicted) cost of the application. Additionally, the metric source 315-*e* may support troubleshooting of the application, such as by identifying cost anomalies associated with resources usage of the application. In some examples, the metric source 315-*e* may associate an environment and project corresponding to the application using the resource tags included in the application.

Additionally, or alternatively, the metric source 315-*e* may include or may provide one or more remedial options for the cost of the application, such as saving suggested presented in a centralized page. The centralized page may allow a user to view savings options for an application. Further, the metric source 315-*e* may track saving suggested provided by an advisor associated with the application, along with a projected savings associated with from shutting down environments (e.g., during low-usage periods) or removing resources no longer in use.

The metric source 315-*f* may include a directory service configured to store information associated with the application on an accessible network. The metric source 315-*f* may include an indication of users 105-*b* associated with the application, an indication of a group associated with the application, or both.

The application manager 305 may store the one or more metrics within a database 310, which may be available to or accessible by the user 105-*b*. In some examples, the database 310 may support resource exploration, such as by allowing a user 105-*b* to view, sort, search, and application resource information using one or more resource tags (e.g., by account, type, tag values, compliance, or the like). Additionally, or alternatively, the database 310 may support source code exploration, such as by allowing the user 105-*b* to view projects associated with the application, a time to market associated with the application, CI/CD metrics of the application, vulnerability metrics of the application, or a combination thereof.

The application manager 305 may generate one or more scores associated with the one or more metric sources 315 for the application using the one or more metrics and may provide the one or more scores to the user. For example, the application manager 305 may generate a dashboard (e.g., single view dashboard, single pane dashboard) and display the dashboard via an online portal. In some cases, the one or more scores may represent a "real time" score for the application. Additionally, or alternatively, the application manager 305 may update the one or more scores according to one or more periodicities. For example, the application manager 305 may update metrics associated with application-level information according to a first periodicity (e.g., once every eight hours) and may update metrics associated with account-level information according to a second periodicity greater than the first periodicity (e.g., daily).

In some cases, the application manager 305 may determine whether the one or more scores or the one or more metrics (or both) satisfy at least one of a set of conditions and may transmit a notification to the user based if the at least one condition is satisfied. For example, if a cost of an application exceeds a threshold, the application manager 305 may transmit notification to the user indicating the cost. In some cases, the application manager 305 may additionally provide one or more remedial options (e.g., to reduce the cost of the application).

Figure 4:
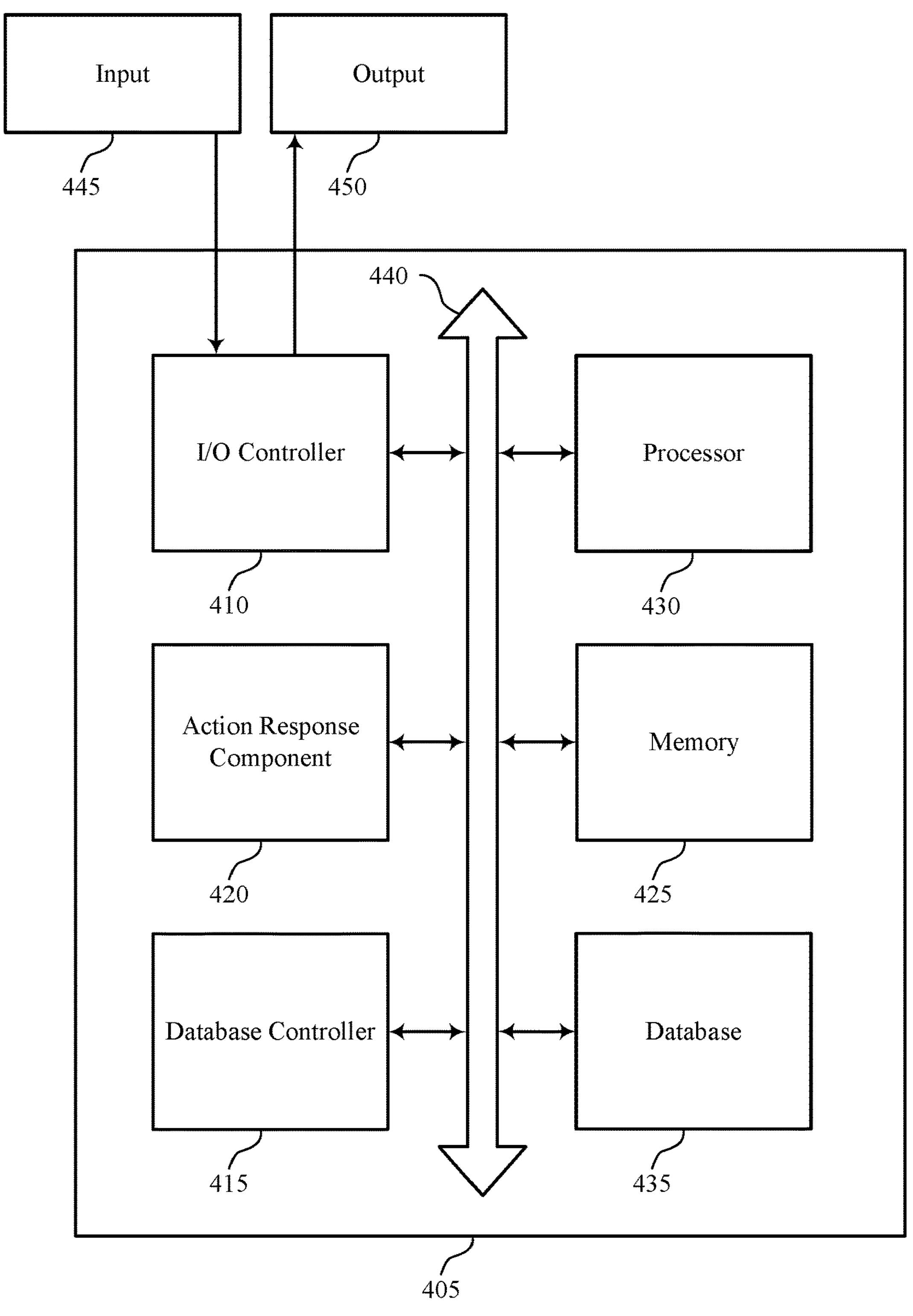
FIG. 4 shows a diagram of a system including a device that supports techniques for application architecture management in accordance with aspects of the present disclosure.

FIG. 4 shows a diagram of a system 400 including a device 405 that supports techniques for application architecture management in accordance with aspects of the present disclosure. The device 405 may include components for bi-directional voice and data communications including components for transmitting and receiving communications, such as an action response component 420, an input/output (I/O) controller 410, a database controller 415, at least one memory 425, at least one processor 430, and a database 435. These components may be in electronic communication or otherwise coupled (e.g., operatively, communicatively, functionally, electronically, electrically) via one or more buses (e.g., a bus 440).

The I/O controller 410 may manage input signals 445 and output signals 450 for the device 405. The I/O controller 410 may also manage peripherals not integrated into the device 405. In some cases, the I/O controller 410 may represent a physical connection or port to an external peripheral. In some cases, the I/O controller 410 may utilize an operating system such as iOS®, ANDROID®, MS-DOS®, MS-WINDOWS®, OS/2®, UNIX®, LINUX®, or another known operating system. Additionally, or alternatively, the I/O controller 410 may represent or interact with a modem, a keyboard, a mouse, a touchscreen, or a similar device. In some cases, the I/O controller 410 may be implemented as part of a processor. In some examples, a user may interact with the device 405 via the I/O controller 410 or via hardware components controlled by the I/O controller 410.

The database controller 415 may manage data storage and processing in a database 435. The database 435 may be external to the device 405, temporarily or permanently connected to the device 405, or a data storage component of the device 405. In some cases, a user may interact with the database controller 415. In some other cases, the database controller 415 may operate automatically without user interaction. The database 435 may be an example of a persistent data store, a single database, a distributed database, multiple distributed databases, a database management system, or an emergency backup database.

Memory 425 may include random-access memory (RAM) and read-only memory (ROM). The memory 425 may store computer-readable, computer-executable software including instructions that, when executed, cause the processor to perform various functions described herein. In some cases, the memory 425 may contain, among other things, a basic input/output system (BIOS), which may control basic hardware or software operation such as the interaction with peripheral components or devices.

The processor 430 may include an intelligent hardware device (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). In some cases, the processor 430 may be configured to operate a memory array using a memory controller. In some other cases, a memory controller may be integrated into the processor 430. The processor 430 may be configured to execute computer-readable instructions stored in memory 425 to perform various functions (e.g., functions or tasks supporting techniques for application architecture management).

For example, the action response component 420 may be configured as or otherwise support a means for identifying one or more architecture components included in a component registry associated with an organization, each architecture component of the component registry configured in accordance with a security policy of the organization. The action response component 420 may be configured as or otherwise support a means for identifying respective configurations for each of the one or more architecture components. The action response component 420 may be configured as or otherwise support a means for generating an application configured for execution in a cloud-based environment based at least in part on integrating the one or more architecture components in accordance with the respective configurations. The action response component 420 may be configured as or otherwise support a means for providing the application to a device associated with a user based at least in part on generating the application.

Figure 5:
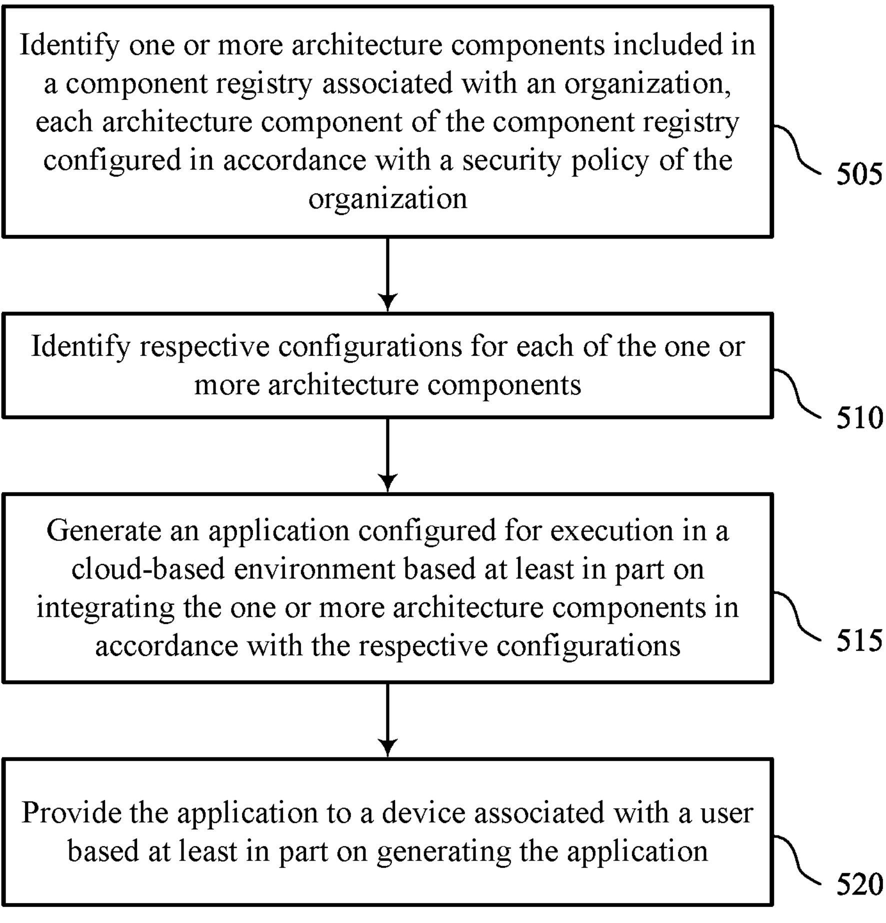
FIG. 5 shows a flowchart illustrating methods that support techniques for application architecture management in accordance with aspects of the present disclosure.

FIG. 5 shows a flowchart illustrating a method 500 that supports techniques for application architecture management in accordance with aspects of the present disclosure. The operations of the method 500 may be implemented by a platform (e.g., an online portal, a website, an application (such as a client-server application)) or its components as described herein. For example, the operations of the method 500 may be performed by a Platform as described with reference to FIGS. 1 through 4. In some examples, a Platform may execute a set of instructions to control the functional elements of the Platform to perform the described functions. Additionally, or alternatively, the Platform may perform aspects of the described functions using special-purpose hardware.

At 505, the method may include identifying one or more architecture components included in a component registry associated with an organization, each architecture component of the component registry configured in accordance with a security policy of the organization. The operations of 505 may be performed in accordance with examples as disclosed herein.

At 510, the method may include identifying respective configurations for each of the one or more architecture components. The operations of 510 may be performed in accordance with examples as disclosed herein.

At 515, the method may include generating an application configured for execution in a cloud-based environment based at least in part on integrating the one or more architecture components in accordance with the respective configurations. The operations of 515 may be performed in accordance with examples as disclosed herein.

At 520, the method may include providing the application to a device associated with a user based at least in part on generating the application. The operations of 520 may be performed in accordance with examples as disclosed herein.

In some examples, an apparatus as described herein may perform a method or methods, such as the method 500. The apparatus may include features, circuitry, logic, means, or instructions (e.g., a non-transitory computer-readable medium storing instructions executable by a processor) for identifying one or more architecture components included in a component registry associated with an organization, each architecture component of the component registry configured in accordance with a security policy of the organization, identifying respective configurations for each of the one or more architecture components, generating an application configured for execution in a cloud-based environment based at least in part on integrating the one or more architecture components in accordance with the respective configurations, and providing the application to a device associated with a user based at least in part on generating the application.

In some examples of the method 500 and the apparatus described herein, identifying the one or more architecture components may include operations, features, circuitry, logic, means, or instructions for providing an indication of the component registry to the device and receiving an API call comprising a user input indicating the one or more architecture components from the device based at least in part on providing the indication of the component registry.

In some examples of the method 500 and the apparatus described herein, identifying the respective configurations may include operations, features, circuitry, logic, means, or instructions for providing an indication of the respective configurations to the device and receiving an API call comprising a user input indicating the respective configurations from the device based at least in part on proving the indication of the respective configurations.

In some examples of the method 500 and the apparatus described herein, identifying, based at least in part on receiving a user input from the device, that the application may be a test application and removing the application after a duration based at least in part on identifying that the application may be a test application.

Some examples of the method 500 and the apparatus described herein may further include operations, features, means, or instructions for identifying one or more second architecture components in accordance with a periodicity and adding the one or more second architecture components to the component registry based at least in part on identifying the one or more second architecture components.

Some examples of the method 500 and the apparatus described herein may further include operations, features, means, or instructions for identifying one or more metrics of the application based at least in part on respective resources associated with the one or more architecture components, generating one or more scores associated with one or more utilities for the application based at least in part on the one or more metrics, and providing the one or more scores to the device.

Some examples of the method 500 and the apparatus described herein may further include operations, features, means, or instructions for identifying the one or more metrics may be based at least in part on an application identifier, the application identifier may be associated with a source code and one or more resources generated from the source code and the source code comprises a reference to the component registry.

Some examples of the method 500 and the apparatus described herein may further include operations, features, means, or instructions for transmitting a notification to the device based at least in part on determining that at least one metric of the one or more metrics satisfies a threshold, the notification associated with the at least one metric.

Some examples of the method 500 and the apparatus described herein may further include operations, features, means, or instructions for providing a remediation option associated with the at least one metric to the device based at least in part on transmitting the notification.

Some examples of the method 500 and the apparatus described herein may further include operations, features, means, or instructions for updating a first metric of the one or more metrics in accordance with a first periodicity based at least in part on providing the one or more scores to the device and updating a second metric of the one or more metrics in accordance with a second periodicity different than the first periodicity based at least in part on providing the one or more scores to the device.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

identifying one or more architecture components included in a component registry associated with an organization, each architecture component of the component registry being configured to comply with a security policy of the organization, wherein identifying the one or more architecture components comprises:

providing an indication of the component registry to a device; and receiving a first application programming interface (API) call comprising a first user input indicating the one or more architecture components from the device based at least in part on providing the indication of the component registry;

identifying respective configurations for each of the one or more architecture components;

generating an application configured for execution in a cloud-based environment based at least in part on integrating the one or more architecture components in accordance with the respective configurations; and providing the application to the device associated with a user based at least in part on generating the application.

2. The method of claim 1, wherein identifying the respective configurations comprises:

providing an indication of the respective configurations to the device; and receiving a second API call comprising a second user input indicating the respective configurations from the device based at least in part on providing the indication of the respective configurations.

3. The method of claim 1, further comprising:

identifying, based at least in part on receiving a third user input from the device, that the application is a test application; and removing the application after a duration based at least in part on identifying that the application is the test application.

4. The method of claim 1, further comprising:

identifying one or more second architecture components in accordance with a periodicity; and adding the one or more second architecture components to the component registry based at least in part on identifying the one or more second architecture components.

5. The method of claim 1, further comprising:

identifying one or more metrics of the application based at least in part on respective resources associated with the one or more architecture components;

generating one or more scores associated with one or more utilities for the application based at least in part on the one or more metrics; and providing the one or more scores to the device.

6. The method of claim 5, wherein:

identifying the one or more metrics is based at least in part on an application identifier, the application identifier is associated with a source code and one or more resources generated from the source code; and the source code comprises a reference to the component registry.

7. The method of claim 5, further comprising:

transmitting a notification to the device based at least in part on determining that at least one metric of the one or more metrics satisfies a threshold, the notification associated with the at least one metric.

8. The method of claim 7, further comprising:

providing a remediation option associated with the at least one metric to the device based at least in part on transmitting the notification.

9. The method of claim 5, further comprising:

updating a first metric of the one or more metrics in accordance with a first periodicity based at least in part on providing the one or more scores to the device; and updating a second metric of the one or more metrics in accordance with a second periodicity different than the first periodicity based at least in part on providing the one or more scores to the device.

10. A non-transitory computer-readable medium storing code, the code comprising instructions executable by one or more processors to:

identify one or more architecture components included in a component registry associated with an organization, each architecture component of the component registry being configured to comply with a security policy of the organization, wherein the instructions to identify the one or more architecture components are further executable by the one or more processors to:

provide an indication of the component registry to a device; and receive a first application programming interface (API) call comprising a user input indicating the one or more architecture components from the device based at least in part on providing the indication of the component registry;

identify respective configurations for each of the one or more architecture components;

generate an application configured for execution in a cloud-based environment based at least in part on integrating the one or more architecture components in accordance with the respective configurations; and provide the application to the device associated with a user based at least in part on generating the application.

11. The non-transitory computer-readable medium of claim 10, wherein the instructions to identify the respective configurations are executable by the one or more processors to:

provide an indication of the respective configurations to the device; and receive a second API call comprising a second user input indicating the respective configurations from the device based at least in part on providing the indication of the respective configurations.

12. The non-transitory computer-readable medium of claim 10, wherein the instructions are further executable by the one or more processors to:

identify, based at least in part on receiving a third user input from the device, that the application is a test application; and remove the application after a duration based at least in part on identifying that the application is the test application.

13. The non-transitory computer-readable medium of claim 10, wherein the instructions are further executable by the one or more processors to:

identify one or more second architecture components in accordance with a periodicity; and add the one or more second architecture components to the component registry based at least in part on identifying the one or more second architecture components.

14. The non-transitory computer-readable medium of claim 10, wherein the instructions are further executable by the one or more processors to:

identify one or more metrics of the application based at least in part on respective resources associated with the one or more architecture components;

generate one or more scores associated with one or more utilities for the application based at least in part on the one or more metrics; and provide the one or more scores to the device.

15. The non-transitory computer-readable medium of claim 14, wherein:

identifying the one or more metrics is based at least in part on an application identifier, the application identifier is associated with a source code and one or more resources generated from the source code, and the source code comprises a reference to the component registry.

16. The non-transitory computer-readable medium of claim 14, wherein the instructions are further executable by the one or more processors to:

transmit a notification to the device based at least in part on determining that at least one metric of the one or more metrics satisfies a threshold, the notification associated with the at least one metric.

17. The non-transitory computer-readable medium of claim 16, wherein the instructions are further executable by the one or more processors to:

provide a remediation option associated with the at least one metric to the device based at least in part on transmitting the notification.

18. An apparatus, comprising:

one or more memories; and one or more processors coupled with the one or more memories and configured to cause the apparatus to:

identify one or more architecture components included in a component registry associated with an organization, each architecture component of the component registry being configured to comply with a security policy of the organization, wherein, to identify the one or more architecture components, the one or more processors are further configured to:

provide an indication of the component registry to a device; and receive a first application programming interface (API) call comprising a first user input indicating the one or more architecture components from the device based at least in part on providing the indication of the component registry;

identify respective configurations for each of the one or more architecture components;

generate an application configured for execution in a cloud-based environment based at least in part on integrating the one or more architecture components in accordance with the respective configurations; and provide the application to the device associated with a user based at least in part on generating the application.

* * * * *